(12) United States Patent
Sotoike

(10) Patent No.: US 6,738,064 B2
(45) Date of Patent: May 18, 2004

(54) IMAGE PROCESSING DEVICE AND METHOD, AND PROGRAM THEREFOR

(75) Inventor: Hiroki Sotoike, Kyoto (JP)

(73) Assignee: Nintendo Co., Ltd., Kyoto (JP)

(*) Notice: Subject to any disclaimer, the term of this patent is extended or adjusted under 35 U.S.C. 154(b) by 273 days.

(21) Appl. No.: 09/986,769

(22) Filed: Nov. 9, 2001

(65) Prior Publication Data
US 2002/0113789 A1 Aug. 22, 2002

(30) Foreign Application Priority Data
Feb. 21, 2001 (JP) ........................................ 2001-044525

(51) Int. Cl.$^7$ ............................................. G06T 15/00
(52) U.S. Cl. ...................................................... 345/426
(58) Field of Search ................................ 345/419, 420, 345/427, 428, 619, 426

(56) References Cited

U.S. PATENT DOCUMENTS 6,441,821 B1 * 8/2002 Nagasawa ................... 345/426
6,525,730 B2 * 2/2003 Tampieri .................... 345/426
6,567,083 B1 * 5/2003 Baum et al. ................ 345/426

OTHER PUBLICATIONS

Forney et al., "Understanding Fire and Smoke Flow Through Modeling and Visualization", IEEEComputer Graphics and Application, Jul. 2003, pp. 6–13.*

* cited by examiner

Primary Examiner—Phu K. Nguyen
(74) Attorney, Agent, or Firm—Nixon & Vanderhye P.C.

(57) ABSTRACT

Provided are image processing devices and methods by which, a polygon analogous to its actual image can be produced through a shading process without placing a heavy load on devices even when there is a light source inside of the polygon, and programs therefor. A color data input section 11 reads coordinate values of each vertex of the polygon from a memory, for example, and rounds those if needed. The values are then regarded as color data of each vertex of the polygon. A gradation section 12 carries out the shading process based on the coordinate values thus set as the color data so that the coordinate values of each pixel in the polygon are derived. A distance calculation section 13 receives coordinate values of a specific point which will be the basis for the shading process, and rounds those if needed. In accordance with the resultant coordinate values, calculated is a distance-between-two-point D between the specific point and each pixel of the polygon. With reference to the color data of the specific point, a color data determination section 14 determines the color data for each pixel of the polygon inclusive of the vertexes in accordance with the distance-between-two-point.

18 Claims, 8 Drawing Sheets

IMAGE PROCESSING DEVICE AND METHOD, AND PROGRAM THEREFOR

BACKGROUND OF THE INVENTION

1. Field of the Invention

The present invention relates to image processing devices and methods, and programs therefor and, more specifically, to image processing devices and methods by which color data is determined in accordance with distances from a specific point to graphically represent polygons, and programs for executing such methods.

2. Description of the Background Art

The conventional process of shading polygon surfaces in accordance with a light source is generally carried out as follows.

FIGS. 7A and 7B are diagrams for illustrating such a conventional shading process. Here, in this description, coordinate values are represented by ( ), while color data by [ ].

In the conventional process, distances from a light source to each vertex of a polygon to be processed are first calculated. In the example of FIG. 7A, coordinate values (x, y, z) of the light source are (0, 10, 0), those for a vertex A of the polygon are (10, 10, 0), those for a vertex B are (30, 20, 0), and those for a vertex C are (30, 0, 0). Therefore, the distance from the light source to the vertex A is "10", and the distance from the light source to the vertex B or to the vertex C is "31.6". Here, a distance-between-two-point D between coordinate values (I, J, K) and coordinate values (i, j, k) can be, as is well known, calculated by the following equation:

$$D=\sqrt{\{(I-i)^2+(J-j)^2+(K-k)^2\}}$$

Next, depending on thus calculated distance-between-two-point D, color data [r, g, b] is determined for each of the vertexes of the polygon. In this example, presumably, color data determined for the vertex A is [255, 255, 255] being white, and color data determined for both the vertex B and the vertex C is [0, 0, 0] being black.

Lastly, a shading process is carried out based on the color data determined for each of the vertexes of the polygon, and in the polygon, every pixel is complemented by color. FIG. 7B shows the polygon to which the shading process is applied under the conditions shown in FIG. 7A. As shown in FIG. 7B, in the conventional shading process, the color data of each pixel in the polygon shows a gradual color change in accordance with the difference in color data among the vertexes. For example, the color data of coordinate values (20, 5, 0) in the polygon is [r, g, b]=[128, 128, 128].

In the above conventional process, however, the distance to the light source is used as the basis for determining color data for each vertex of the polygon. Accordingly, as shown in FIG. 7A, there would be no problem if the light source is provided outside of the polygon to be processed. If the light source is provided inside of the polygon, however, the following problem arises.

As shown in FIG. 8A, in the case where the light source positions inside of the polygon, specifically when the distance therefrom is equal to all of the vertexes, determining color data for each of the vertexes of the polygon in accordance with the distance to the light source results all in the same data. If this is the case, if the shading process is applied by using the resultant color data of a kind, as shown in FIG. 8B, the polygon will be color-filled in its entirety by the same color data as the vertexes. Therefore, the processing result will be a far cry from the actual shading as shown in FIG. 9 which is expected to be.

For the purpose of overcoming such a problem, the polygon may be divided into smaller pieces, and the above shading process may be applied to each of the divided polygon pieces. Such image processing, however, definitely places a heavy load on devices, and thus large-sized high-performance computers may be a possibility, for example, but home personal computers and game machines have a practical difficulty.

SUMMARY OF THE INVENTION

Therefore, an object of the present invention is to provide image processing devices and methods by which a polygon analogous to its actual image can be produced through a shading process without placing a heavy load on devices even if there is a light source inside of the polygon, and programs therefor.

The present invention has the following features to attain the object above.

A first aspect of the present invention is directed to an image processing device including a gradation part for generating color data on a pixel basis of a polygon for gradation representation between vertexes of the polygon based on what color each of the vertexes has, and the device comprises coordinate value input means, a coordinate value read part, a distance calculation part, and a color determination part.

The coordinate value input part inputs, to the gradation part, coordinate values of each of the vertexes of the polygon as color data. The coordinate value read part reads, as coordinate values of each of the pixels, color data of each pixel of the polygon generated by the gradation part based on the data provided by the coordinate value input part. The distance calculation part calculates a distance between the coordinate values of each of the pixels of the polygon read by the coordinate value read part, and coordinate values of a specific point. The color data determination part determines the color data of each of the pixels of the polygon in accordance with the distance calculated by the distance calculation part.

As described above, in the first aspect, a shading process is applied to coordinate values of each vertex of a polygon, and by using coordinate values of each pixel thus obtained thereby, the color of the light source and the texture color, for example, are changed in accordance with the distance from a specific point to each of the pixels. In this manner, a polygon analogous to its actual image can be produced through the shading process without placing a heavy load on devices even if there is a light source inside of the polygon.

Preferably, the coordinate value input part inputs, to the gradation part, a value obtained by dividing the coordinate values of each of the vertexes of the polygon by a predetermined value to have the value fall in a range of color data processable by the gradation part, and the distance calculation part regards the value obtained by dividing the coordinate values of the specific point by the predetermined value as the coordinate values of the specific point for distance calculation.

As such, by dividing the coordinate values of each of the vertexes of the polygon by a predetermined value to round those into any appropriate coordinate values, the coordinate values of each vertex of the polygon can be handled as the color data.

Here, when the specific point is a position of a light source, the color data determination part may determine, by referring to a brightness of the light source, a brightness of each of the pixels of the polygon according to the distance calculated by the distance calculation part.

As such, by changing the brightness of each pixel of the polygon in accordance with the distance from the light source, such representation as the light is falling thereon can be realized.

Further, when the specific point is a position of a camera, the color data determination part may determine, with reference to the position of the camera, a color of each of the pixels of the polygon through blurring according to the distance calculated by the distance calculation part.

As such, by changing the color of each pixel of the polygon in accordance with the distance from the camera, depth field representation can be realized from the camera's viewpoint.

A second aspect of the present invention is directed to an image processing method using a gradation part for generating color data on a pixel basis of a polygon for gradation representation between vertexes of the polygon based on what color each of the vertexes has, and the method includes an inputting step, a reading step, a calculating step, and a determining step.

In the inputting step, coordinate values of each of the vertexes of the polygon is inputted to the gradation part as color data. In the reading step, as coordinate values of each of the pixels, color data of each pixel of the polygon generated by the gradation part is read based on the inputted data. In the calculating step, calculated is a distance between the coordinate values of each of the pixels of the read polygon, and coordinate values of a specific point. In the determining step, the color data of each of the pixels of the polygon is determined in accordance with the calculated distance.

As described above, in the second aspect, a shading process is applied to coordinate values of each vertex of a polygon, and by using coordinate values of each pixel thus obtained thereby, the color of the light source and the texture color, for example, are changed in accordance with the distance from a specific point to each of the pixels. In this manner, a polygon analogous to its actual image can be produced through the shading process without placing a heavy load on devices even if there is a light source inside of the polygon.

Preferably, an inputting step is further included to input, to the gradation part, a value obtained by dividing the coordinate values of each of the vertexes of the polygon by a predetermined value to have the value fall in a range of color data processable by the gradation part. In the calculating step, the value obtained by dividing the coordinate values of the specific point by the predetermined value is regarded as the coordinate values of the specific point for distance calculation.

As such, by dividing the coordinate values of each of the vertexes of the polygon by a predetermined value to round those into any appropriate coordinate values, the coordinate values of each vertex of the polygon can be handled as the color data.

Here, when the specific point is a position of a light source, the determining step may determine, by referring to a brightness of the light source, a brightness of each of the pixels of the polygon according to the calculated distance.

As such, by changing the brightness of each pixel of the polygon in accordance with the distance from the light source, such representation as the light is falling thereon can be realized.

Further, when the specific point is a position of a camera, the determining step may determine, with reference to the position of the camera, a color of each of the pixels of the polygon through blurring according to the calculated distance.

As such, by changing the color of each pixel of the polygon in accordance with the distance from the camera, depth field representation can be realized from the camera's viewpoint.

A third aspect of the present invention is directed to a program for having computers carried out the image processing method of the second aspect, that is, having those carried out the inputting step, the reading step, the calculating step, and the determining step. By having the computers carried out this program, the above described useful effects can be successfully achieved.

These and other objects, features, aspects and advantages of the present invention will become more apparent from the following detailed description of the present invention when taken in conjunction with the accompanying drawings.

DESCRIPTION OF THE PREFERRED EMBODIMENT

Image processing devices and methods provided by the present invention are applied to graphic systems, game machines, and the like, which require image representation by polygons, and realized by carrying out characteristic processes together with CPUs and memories provided in such systems and machines.

Described below are the image processing devices and methods provided by the present invention while representing constituents for carrying out such characteristic processes by functional blocks.

Figure 1:
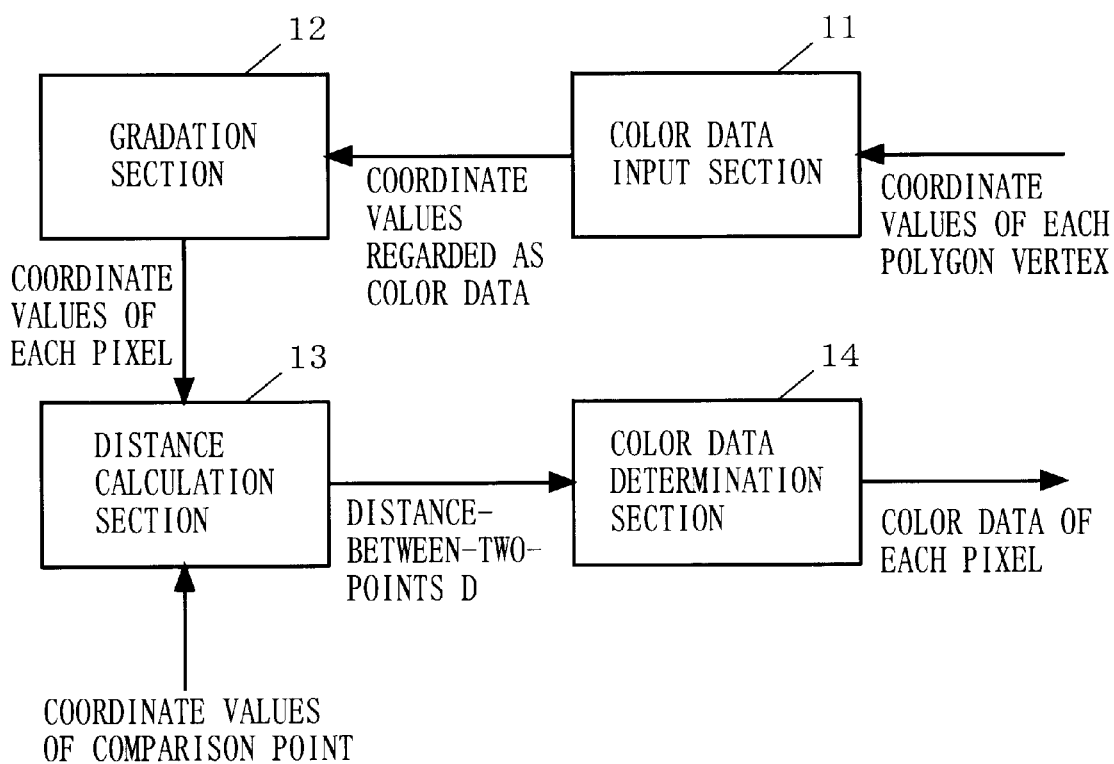
FIG. 1 is a diagram which represents an image processing device according to one embodiment of the present invention by functional blocks.

FIG. 1 is a diagram which represents an image processing device according to one embodiment of the present invention by functional blocks. In FIG. 1, the image processing device of the present embodiment includes a color data input section 11, a gradation section 12, a distance calculation section 13, and a color data determination section 14. FIG.

2 is a flowchart showing the procedure of an image processing method carried out by the image processing device according to one embodiment of the present invention.

Here, in the below, described is the case where polygons are presumably triangles. However, any other polygons can be processed in the similar manner.

First of all, the color data input section 11 reads, from a predetermined memory, for example, coordinates values of vertexes of a polygon to be processed, i.e., (x0, y0, z0), (x1, y1, z1), and (x2, y2, z2) (step S201).

Then, the color data input section 11 divides these coordinate values by a predetermined value and then rounds so that the resultant coordinate values (X0, Y0, Z0), (X1, Y1, Z1), and (X2, Y2, Z2) fall in a range of color data processable by the gradation section 12 (step S202). This process is applied to enable the gradation section 12 to handle the coordinate values of the vertexes as color data even if a data range used for color representation is narrower than a data range used for coordinate representation. Assuming a case where the coordinate values are represented in a range of 0 to 1023, and the color data is represented in a range of 0 to 255, the color data input section 11 divides each of the coordinate values by 4 so as to derive the rounded coordinate values (x0/4, y0/4, z0/4), (x1/4, y1/4, z1/4), and (x2/4, y2/4, z2/4). Here, if there is no need to round the values, the read coordinate values (x0, y0, z0), (x1, y1, z1), and (x2, y2, z2) are used in the following process as they are.

The color data input section 11 then sets thus derived rounded coordinate values to the color data of the vertexes of the polygon, i.e., [X0, Y0, Z0], [X1, Y1, Z1], and [X2, Y2, Z2] for output to the gradation section 12 (step S203).

Based on thus provided rounded coordinate values regarded as the color data of the vertexes of the polygon, the gradation section 12 then carries out the shading process described in the above Background Art so as to derive color data [Rm, Gm, Bm] for every pixel of the gradated polygon (step S204). Here, m is in a range of 1 to the number of pixels. As such, by going through the shading process using the coordinate values of the vertexes instead of color data thereof, the color data resultantly derived through this process will correspond to the coordinate values (Rm, Gm, Bm) of each pixel of the polygon. Therefore, any existing constituent (e.g., color combiner) in the conventional graphic systems and game machines, i.e., constituent by which the color data of pixels are derived from the color data of the vertexes, can be utilized as the gradation section 12 without any change.

The gradation section 12 provides, to the distance calculation section 13, the color data as the coordinate values of the pixels (step S205).

The distance calculation section 13 receives coordinate values (x, y, z) of a specific point at where a light source is positioned, for example, to use those as a reference for the shading process, and rounds the values in the similar manner to the color data input section 11 to derive rounded coordinate values (X, Y, Z) (step S206). Here, if the color data input section 11 has not rounded the coordinate values, the received coordinate values (x, y, z) are used as they are in the following process.

In accordance with the coordinate values, the distance calculation section 13 then calculates a distance-between-two-point D for every pixel of the polygon from the specific point (step S207). Here, in this example, the coordinate values may be divided by a value of 4 or larger (for example, "8"). The distance-between-two-point D to be calculated may be a root-sum-square of the difference among the coordinate values as described in Background Art, or simply a sum-square of the difference among the coordinate values.

$$D=\sqrt{\{(X-Rm)^2+(Y-Gm)^2+(Z-Bm)^2\}} \text{ or}$$

$$D=(X-Rm)^2+(Y-Gm)^2+(Z-Bm)^2$$

The distance calculation section 13 then outputs those calculated distance-between-two-points D to the color data determination section 14. Here, out of the coordinate values, the X coordinate is provided to the gradation section 12 as an R value of the color data, the Y coordinate as a G value of the color data, and the Z coordinate as a B value of the color data. It should be noted that the correlation between the coordinates and color data is not limited to this example.

With reference to the color data of the specific point, the color data determination section 14 determines the color data of every pixel of the polygon inclusive of vertexes according to the distance-between-two-points D (step S208). Here, the manner of color data determination can be set freely depending on performance and purpose of graphic representation.

As an example, the color data may be determined through calculation of (texture color m)×65536/Dm, for example. Herein, m is in a range of 1 to the number of pixels.

Figure 9:
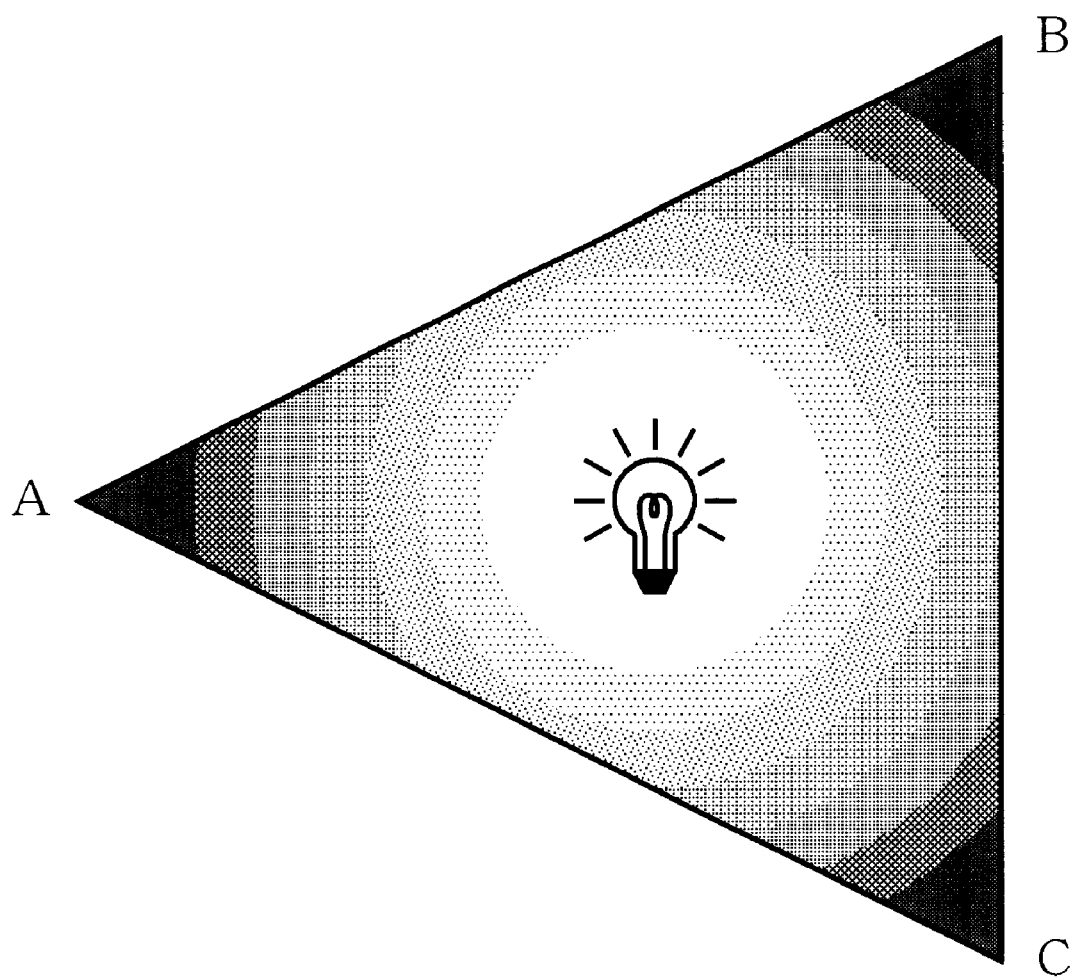
FIG. 9 is a diagram showing how actual shading is supposed to be with the light source arrangement of FIG. 8.

As such, the process which is originally applied to the color data is applied to the coordinate values of the vertexes of the polygon so that the coordinate values of the pixels in the polygon can be each derived. Accordingly, by using these coordinate values, calculated is the distance from the specific point to each of the pixels. As shown in FIG. 9, the color data thus can be set to the positions of the pixels appropriately for the respective distances to the light source.

Generally, distance calculation and color data determination as above are done by the color combiners incorporated in the graphic systems and game machines, for example. Such color combiners are provided with a calculation function which is determined by predetermined parameters. Equations and the number of calculations to be processed by the color combiners are set by predetermined parameters through a program executed by CPUs.

To be specific, after a color combiner performs calculation as below, distance calculation and color data determination will follow. Here, one calculation process carried out by the color combiner is referred to as a "stage".

First of all, in stages 1 to 4, the X coordinate is calculated.

In the stage 1, an equation is so set as to satisfy the following.

Color Data (R) of each Pixel−Coordinate Value (X) of Specific Point

Figure 2:
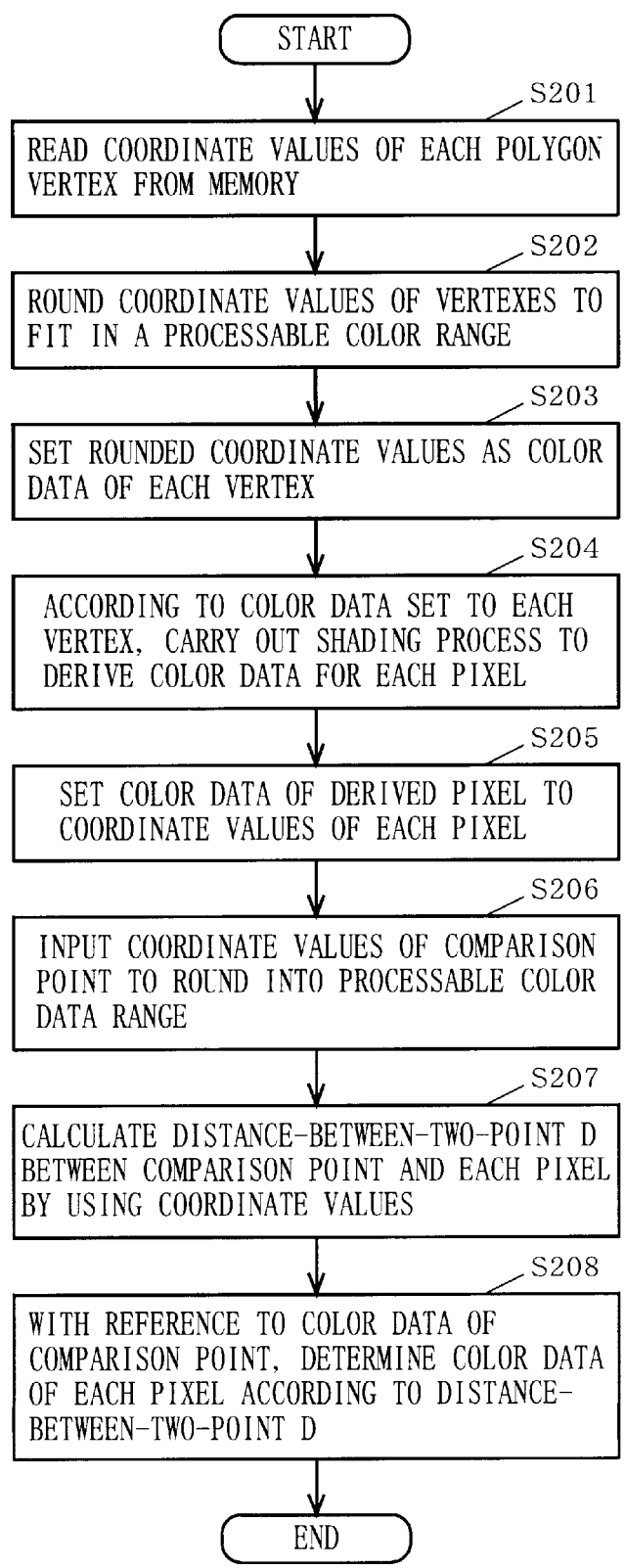
FIG. 2 is a flowchart showing the procedure of an image processing method executed by the image processing device according to one embodiment of the present invention.

Here, the color data (R) of each pixel is the color data (R) derived in step S204 of FIG. 2 in the above. The result obtained by this equation will be so set as to be stored in a register 0. Note here that the coordinate value (X) of the specific point is presumably a value obtained by dividing the coordinate value (x) by 4 and then rounding (X=x/4).

In the stage 2, an equation is so set as to satisfy the following.

Coordinate Value (X) of Specific Point−Color Data (R) of each Pixel

The result obtained by this equation will be so set as to be stored in a register 1.

In the stage 3, an equation is so set as to satisfy the following.

Value in Register 0+Value in Register 1

Here, the result obtained by this equation will be so set as to be stored in a register 2. In this manner, calculated is the difference in terms of X coordinate between the coordinates of the specific point and the coordinates of each pixel. Here, the reason for calculating the sum of the stages 1 and 2 is that no negative value is usable in the color combiner. Therefore, if the calculation result is negative in value, indicated is "0".

In the stage 4, an equation is so set as to satisfy the following.

Value in Register 2×Value in Register 2

The result obtained by this equation is so set as to be stored in a register 3. In this manner, calculated is the square of the difference in terms of X coordinate between the coordinates of the specific point and the coordinates of each pixel.

Next, in stages 5 to 8, the Y coordinate is calculated.

In the stage 5, an equation is so set as to satisfy the following.

Color Data (G) of each Pixel−Coordinate Value (Y) of Specific Point

Here, the color data (G) of each pixel is the color data (G) derived in step S204 of FIG. 2 in the above. The result obtained by this equation will be so set as to be stored in the register 0. Note here that the coordinate value (Y) of the specific point is presumably a value obtained by dividing the coordinate value (y) by 4 and then rounding (Y=y/4).

In the stage 6, an equation is so set as to satisfy the following.

Coordinate Value (Y) of Specific Point−Color Data (G) of each Pixel

The result obtained by this equation will be so set as to be stored in the register 1.

In the stage 7, an equation is so set as to satisfy the following.

Value in Register 0+Value in Register 1

Here, the result obtained by this equation will be so set as to be stored in the register 2. In this manner, calculated is the difference in terms of Y coordinate between the coordinates of the specific point and the coordinates of each pixel.

In the stage 8, an equation is so set as to satisfy the following.

Value in Register 2×Value in Register 2+Value in Register 3

The result obtained by this equation is so set as to be stored in the register 3 again. In this manner, derived is the sum of "the square of the difference in terms of X coordinate between the coordinates of the specific point and the coordinates of each pixel" and "the square of the difference in terms of Y coordinate between the coordinates of the specific point and the coordinates of each pixel".

Further, in stages 9 to 12, the Z coordinate is calculated.

In the stage 9, an equation is so set as to satisfy the following.

Color Data (B) of each Pixel−Coordinate Value (Z) of Specific Point

Here, the color data (B) of each pixel is the color data (B) derived in step S204 of FIG. 2 in the above. The result obtained by this equation will be so set as to be stored in the register 0. Note here that the coordinate value (Z) of the specific point is presumably a value obtained by dividing the coordinate value (z) by 4 and then rounding (Z=z/4).

In the stage 10, an equation is so set as to satisfy the following.

Coordinate Value (Z) of Specific Point−Color Data (B) of each Pixel

The result obtained by this equation will be so set as to be stored in the register 1.

In the stage 11, an equation is so set as to satisfy the following.

Value in Register 0+Value in Register 1

Here, the result obtained by this equation will be so set as to be stored in the register 2. In this manner, calculated is the difference in terms of Z coordinate between the coordinates of the specific point and the coordinates of each pixel.

In the stage 12, an equation is so set as to satisfy the following.

Value in Register 2×Value in Register 2+Value in Register 3

The result obtained by this equation is so set as to be stored in the register 3 again. In this manner, derived is the sum (i.e., the square of the distance) of "the square of the difference in terms of X coordinate between the coordinates of the specific point and the coordinates of each pixel", "the square of the difference in terms of Y coordinate between the coordinates of the specific point and the coordinates of each pixel", and "the square of the difference in terms of Z coordinate between the coordinates of the specific point and the coordinates of each pixel".

After calculating the square of each distance in the stages 1 to 12, performed next is calculation for color data determination.

In a stage 13, an equation is so set as to satisfy the following.

Arbitrary Constant (e.g., 255)−Value of Register 3 (the square of the distance)

Here, the result obtained by this equation is so set as to be stored in the register 3 again. Here, if the calculation result is negative in value, indicated is "0". In this manner, the resultant value will be the smaller as the distance becomes the larger.

In a stage 14, an equation is so set as to satisfy the following.

Texture Color of each Pixel×Value of Register 3

Here, the result obtained by this equation is so set as to be stored in the register 3 again. This value of the register 3 will be the color data eventually outputted to the screen. That is, the color data to be outputted will be the darker as the distance becomes the larger.

Figure 3:
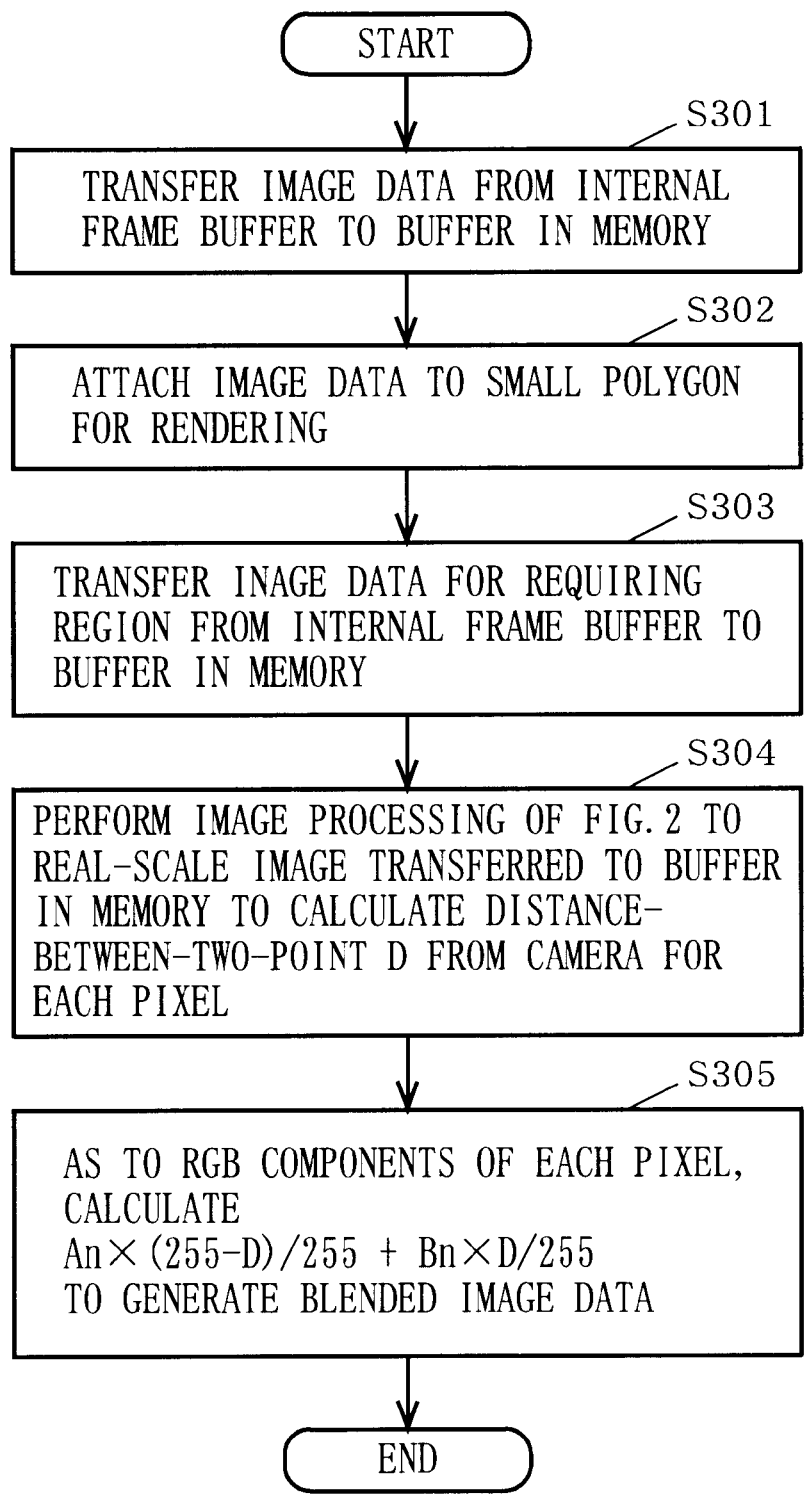
FIG. 3 is a flowchart showing an example of the procedure for realizing depth of field representation when coordinates of a specific point are set as coordinates of a camera.

Here, assuming that the coordinates of the specific point are the coordinates of a camera, calculated will be the distance-between-two-point D from the camera to each pixel. Accordingly, with an appropriate filter in accordance with the distance-between-two-point D, depth of field representation can be realized. FIG. 3 shows an exemplary procedure for realizing the depth of field representation when the coordinates of the specific point are regarded as the coordinates of the camera.

First, from a frame buffer previously incorporated in the system to which the image processing device of the present invention is applied, image data of a frame is transferred to a buffer provided in a memory for storing real scale images (step S301). This image data is now referred to as real-scale image data A. Next, on the frame buffer, the image data of a frame is attached onto a polygon of a predetermined size smaller than a single frame for rendering (step S302). As such, with an image generated by down-scaling the image of a frame, the resultant image data will be reduced in resolution and thus looks coarse (gradated). Then, from the frame buffer to a buffer provided in the memory for storing down-scaled images, the image data is transferred for any required region (step S303). This image data is now referred to as down-scaled image data B.

Then, as to the real-scale image data, the above steps S201 to S208 of FIG. 2 are carried out so that the distance-between-two-point D from the camera is calculated for each of the pixels (step S304). Based on color data [Ar, Ag, Ab] of the buffer for storing real-scale images, color data [Br, Bg, Bb] of the buffer for storing down-scaled images, and those distance-between-two-points D, the following calculation is performed to each of the pixels in terms of its RGB component, respectively.

$$An \times (255-D)/255 + Bn \times D/255$$

(where n=r, g, or b)

Obtained thereby is image data, for actual display, having the real-scale image data A blended together with the down-scaled image data B (step S305). By this color blending (filtering), the color data thus gradated appropriately for the distance from the camera position can be added to each of the pixels.

In such a case where the coordinates of the specific point are the coordinates of the camera, described next is calculation for color data determination in the stage 13 and thereafter in the above color combiner.

In the stage 13, an equation is so set as to satisfy the following.

Arbitrary Constant (e.g., 255)−Value of Register 3 (the square of the distance)

Here, the result obtained by the equation is so set as to be stored in the register 3 again. In the case where the calculation result is negative in value, indicated is "0". In this manner, the resultant value will be the smaller as the distance becomes the larger.

In the stage 14, the texture color of each pixel in the down-scaled image is so set as to be stored in the 0.

In the stage 15, an equation is so set as to satisfy the following.

((Arbitrary Constant−Value in Register 3)×Texture Color of each Pixel in Real-Scale image+Value in Register 3×Value in Register 0)/Arbitrary Constant In this equation, the arbitrary constant is 255, for example. The result obtained by this equation is so set as to be stored in the register 3 again. This value in the register 3 will be the color data eventually outputted to the screen.

Figure 4:
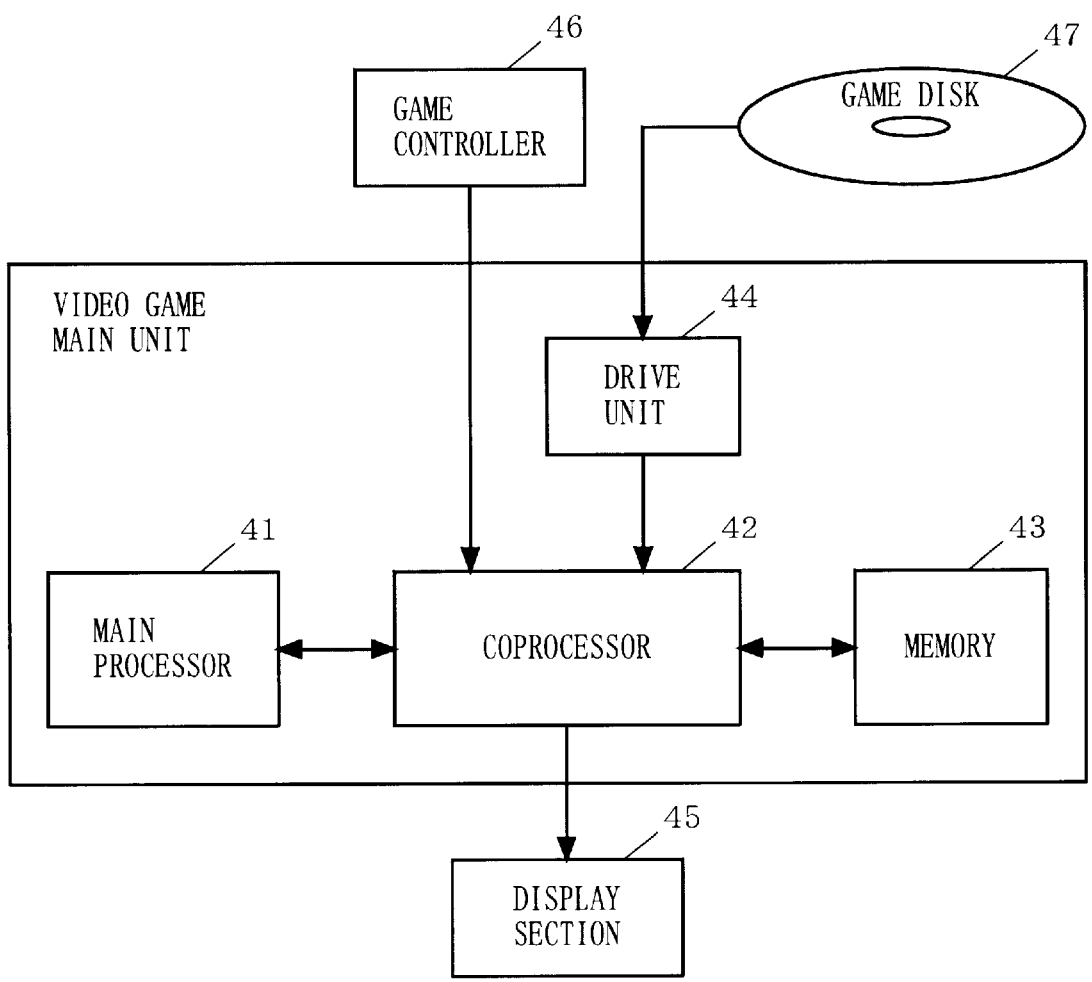
FIG. 4 is a block diagram showing an exemplary structure of a game system to which the image processing method according to one embodiment of the present invention is applied.
Figure 5:
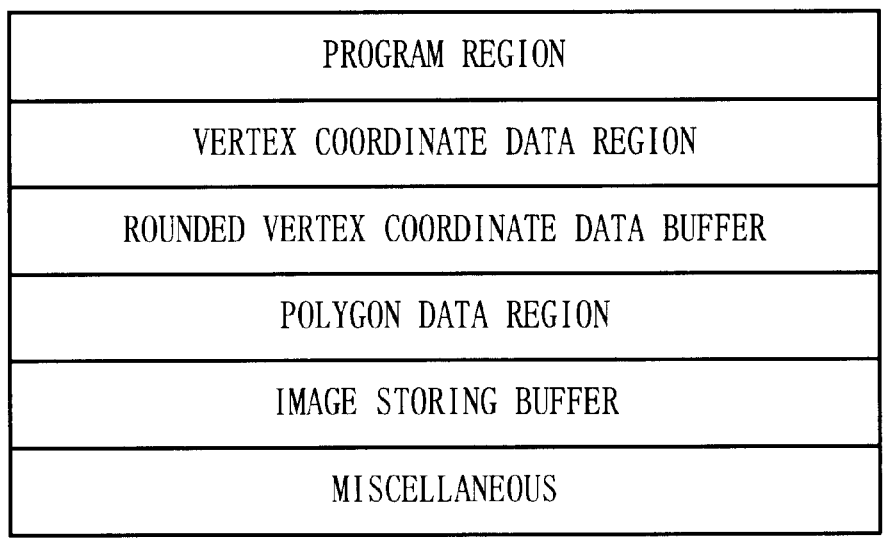
FIG. 5 is a diagram showing an exemplary memory map of a memory 43 of FIG. 4.
Figure 6:
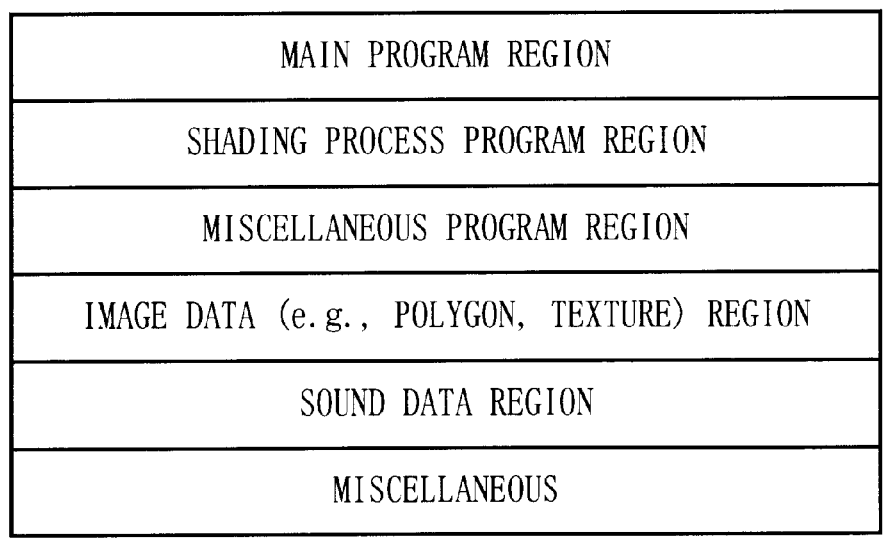
FIG. 6 is a diagram showing an exemplary memory map of a game disk 47 of FIG. 4.
Figure 7A:
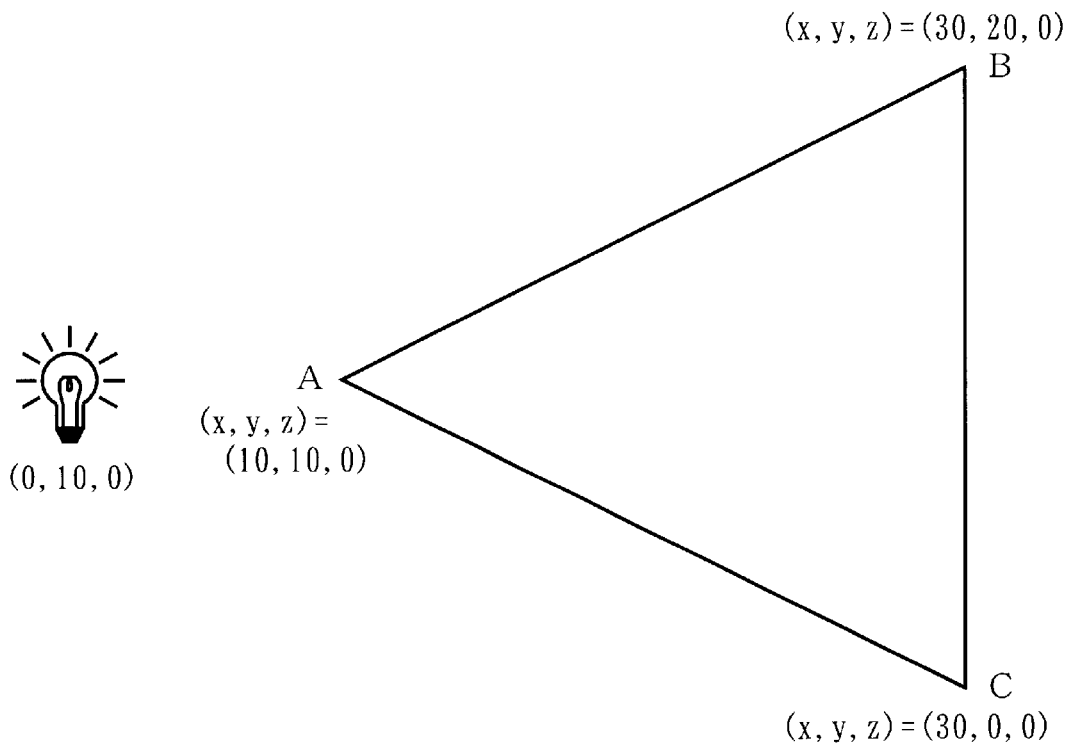
FIGS. 7A and 7B are diagrams illustrating a conventional shading process.
Figure 7B:
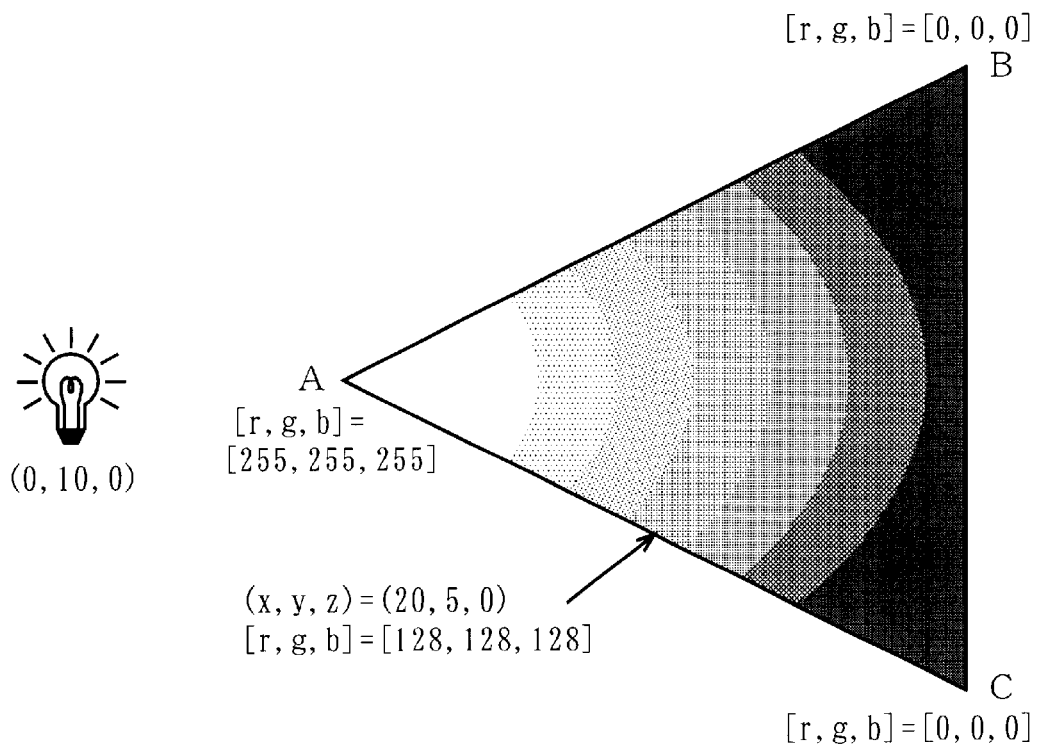
Figure 8A:
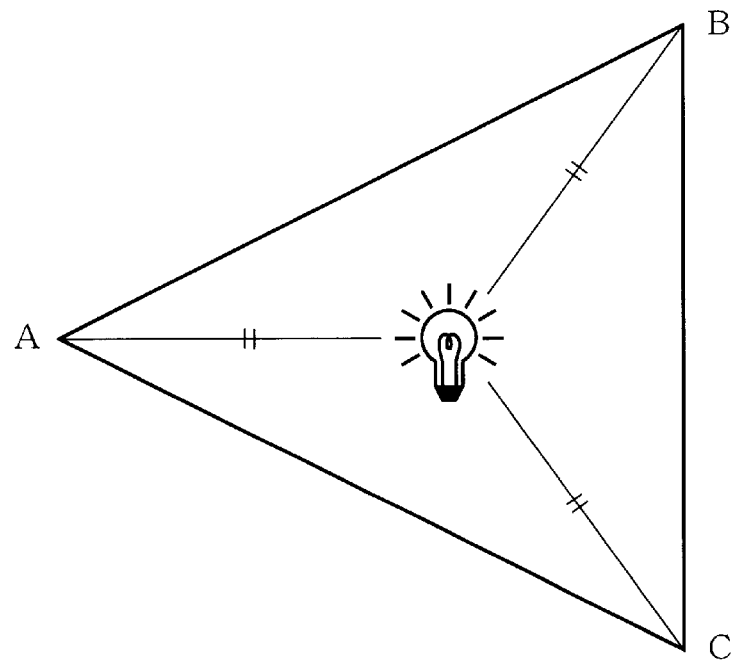
FIGS. 8A and 8B are diagrams illustrating a problem of the conventional shading process.
Figure 8B:
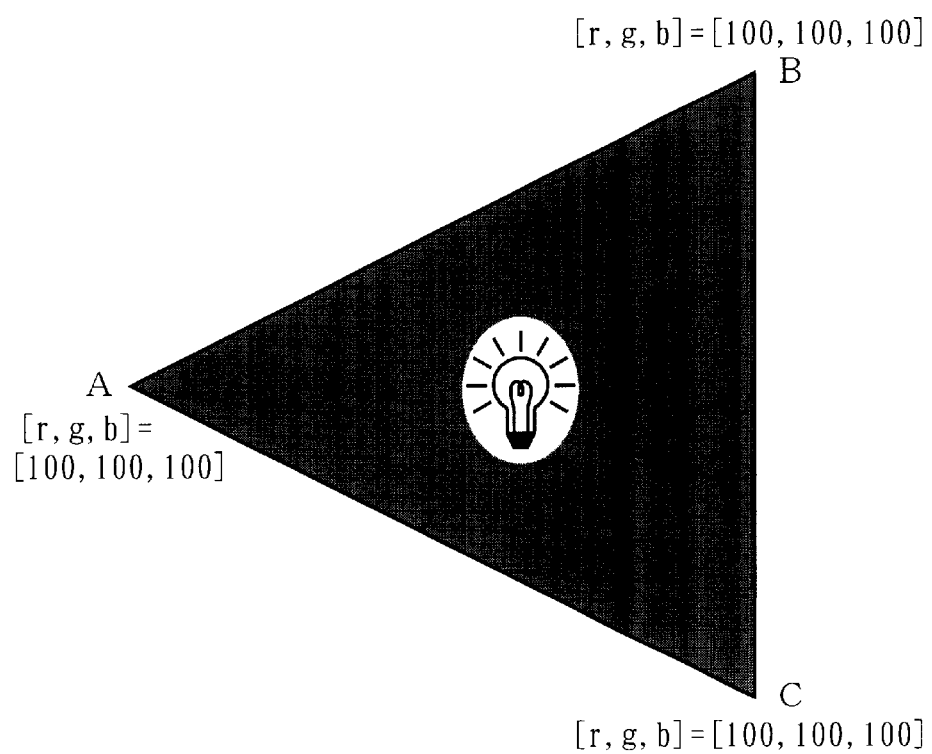

FIG. 4 shows an exemplary structure of a video game system to which the above image processing method is applied. In FIG. 4, the image processing method is carried out in a coprocessor 42. In a memory 43, programs and data are stored as shown in FIG. 5. A game disk 47 is a recording medium exemplified by a DVD, and stores programs and data as shown in FIG. 6.

In the memory 43, a program region stores a basic system program for operating a video game main unit. A vertex coordinate data region stores the coordinate values of each vertex of the polygon read by the color data input section 11 in step S201 of FIG. 2 in the above. A rounded vertex coordinate data buffer stores the coordinate values of each vertex of the polygon rounded by the color data input section 11 in step S202. A polygon data region stores information indicating, for example, connection among vertexes for structuring a single frame image. An image storing buffer stores both the real-scale image data A coming from the frame buffer in step S301 of FIG. 3 above, and the down-scaled image data B coming from the frame buffer in step S303.

In the game disk 47, a main program region stores a basic program for operating games. A shading process program region stores a program for executing a shading process using coordinate values of each vertex instead of color data thereof, and for calculating the distance from the specific point to each of the pixels so as to determine the color data (e.g., assignment process, operation process). Since the graphic representation varies depending on the game type, the game machines are so structured that an instruction for executing the shading process with respect to the polygon is provided from the game disk 47. Miscellaneous program region stores any programs other than the main program and shading process program. An image data region stores various data relating to polygons and textures, for example, needed for graphic representation in the games. A sound data region stores various data relating to sound representation in the games.

As described above, in the image processing device and method according to one embodiment of the present invention, a shading process is applied to coordinate values of each vertex of a polygon, and by using coordinate values of each pixel thus obtained thereby, the pixels are changed in color in accordance with its distance from a specific point. For example, when the specific point is a light source, changed in accordance with the distance is the color brightness, and when the specific point is a position at where a camera is placed, graduation is applied in accordance with the distance.

In this manner, a polygon analogous to its actual image can be produced through a shading process without placing a heavy load on devices even if there is a light source inside of the polygon. Further, by regarding the position of a camera as a specific point, depth field representation can be realized from the camera's viewpoint.

While the invention has been described in detail, the foregoing description is in all aspects illustrative and not restrictive. It is understood that numerous other modifications and variations can be devised without departing from the scope of the invention.

What is claimed is:

1. An image processing device including gradation section for generating color data on a pixel basis of a polygon for gradation representation between vertexes of the polygon based on what color each of the vertexes has, said device comprising:
   coordinate value input section for inputting, to said gradation section, coordinate values of each of the vertexes of the polygon instead of color data;
   coordinate value read section for reading, as coordinate values of each of the pixels, color data of each pixel of said polygon generated by said gradation section based on the values provided by said coordinate value input section;
   distance calculation section for calculating a distance between the coordinate values of each of the pixels of said polygon read by said coordinate value read section, and coordinate values of a specific point; and
   color data determination section for determining the color data of each of the pixels of said polygon in accordance with the distance calculated by said distance calculation section.

2. The image processing device according to claim 1, wherein
said coordinate value input section inputs, to said gradation section, a value obtained by dividing the coordinate values of each of the vertexes of said polygon by a predetermined value to have the value fall in a range of color data processable by said gradation section, and
said distance calculation section regards the value obtained by dividing the coordinate values of said specific point by said predetermined value as the coordinate values of said specific point for distance calculation.

3. The image processing device according to claim 1, wherein
when said specific point is a position of a light source,
said color data determination section determines, by referring to a brightness of said light source, a brightness of each of the pixels of the polygon according to the distance calculated by said distance calculation section.

4. The image processing device according to claim 1, wherein
when said specific point is a position of a camera,
said color data determination section determines, with reference to the position of said camera, a color of each of the pixels of the polygon through blurring according to the distance calculated by said distance calculation section.

5. An image processing method using gradation section for generating color data on a pixel basis of a polygon for gradation representation between vertexes of the polygon based on what color each of the vertexes has, said method comprising the steps of:
inputting, to said gradation section, coordinate values of each of the vertexes of the polygon instead of color data;
reading, as coordinate values of each of the pixels, color data of each pixel of said polygon generated by said gradation section based on said inputted values;
calculating a distance between the coordinate values of each of the pixels of said read polygon, and coordinate values of a specific point; and
determining the color data of each of the pixels of said polygon in accordance with said calculated distance.

6. The image processing method according to claim 5, further comprising the step of
inputting, to said gradation section, a value obtained by dividing the coordinate values of each of the vertexes of said polygon by a predetermined value to have the value fall in a range of color data processable by said gradation section, wherein
said distance calculating step regards the value obtained by dividing the coordinate values of said specific point by said predetermined value as the coordinate values of said specific point for distance calculation.

7. The image processing method according to claim 5, wherein
when said specific point is a position of a light source,
said determining step determines, by referring to a brightness of said light source, a brightness of each of the pixels of the polygon according to said calculated distance.

8. The image processing method according to claim 5, wherein
when said specific point is a position of a camera,
said determining step determines, with reference to the position of said camera, a color of each of the pixels of the polygon through blurring according to said calculated distance.

9. A program for carrying out on a computer an image processing method using gradation section for generating color data on a pixel basis of a polygon for gradation representation between vertexes of the polygon based on what color each of the vertexes has, said program comprising the steps of:
inputting, to said gradation section, coordinate values of each of the vertexes of the polygon instead of color data;
reading, as coordinate values of each of the pixels, color data of each pixel of said polygon generated by said gradation section based on said inputted values;
calculating a distance between the coordinate values of each of the pixels of said read polygon, and coordinate values of a specific point; and
determining the color data of each of the pixels of said polygon in accordance with said calculated distance.

10. The program according to claim 9, further comprising the step of
inputting, to said gradation section, a value obtained by dividing the coordinate values of each of the vertexes of said polygon by a predetermined value to have the value fall in a range of color data processable by said gradation section, wherein
said distance calculating step regards the value obtained by dividing the coordinate values of said specific point by said predetermined value as the coordinate values of said specific point for distance calculation.

11. The program according to claim 9, wherein
when said specific point is a position of a light source,
said determining step determines, by referring to a brightness of said light source, a brightness of each of the pixels of the polygon according to said calculated distance.

12. The program according to claim 9, wherein
when said specific point is a position of a camera,
said determining step determines, with reference to the position of said camera, a color of each of the pixels of the polygon through blurring according to said calculated distance.

13. An image processing device including gradation part for generating color data on a pixel basis of a polygon for gradation representation between vertexes of the polygon based on what color each of the vertexes has, said device comprising:
coordinate value input part for inputting, to said gradation part, coordinate values of each of the vertexes of the polygon;
coordinate value read part for reading, as coordinate values of each of the pixels, color data of each pixel of said polygon generated by said gradation part based on the values provided by said coordinate value input part;
distance calculation part for calculating a distance between the coordinate values of each of the pixels of said polygon read by said coordinate value read part, and coordinate values of a specific point; and
color data determination part for determining the color data of each of the pixels of said polygon in accordance with the distance calculated by said distance calculation part.

14. An image processing method using gradation part for generating color data on a pixel basis of a polygon for gradation representation between vertexes of the polygon based on what color each of the vertexes has, said method comprising:

inputting, to said gradation part, coordinate values of each of the vertexes of the polygon;

reading, as coordinate values of each of the pixels, color data of each pixel of said polygon generated by said gradation part based on said inputted values;

calculating a distance between the coordinate values of each of the pixels of said read polygon, and coordinate values of a specific point; and determining the color data of each of the pixels of said polygon in accordance with said calculated distance.

15. A program for carrying out on a computer an image processing method using gradation part for generating color data on a pixel basis of a polygon for gradation representation between vertexes of the polygon based on what color each of the vertexes has, said program comprising the steps of:

inputting, to said gradation part, coordinate values of each of the vertexes of the polygon;

reading, as coordinate values of each of the pixels, color data of each pixel of said polygon generated by said gradation part based on said inputted values;

calculating a distance between the coordinate values of each of the pixels of said read polygon, and coordinate values of a specific point; and determining the color data of each of the pixels of said polygon in accordance with said calculated distance.

16. The image processing device according to claim 13, wherein said coordinate value input part inputs, to said gradation part, a value obtained by dividing the coordinate values of each of the vertexes of said polygon by a predetermined value to have the value fall in a range of color data processable by said gradation part, and said distance calculation part regards the value obtained by dividing the coordinate values of said specific point by said predetermined value as the coordinate values of said specific point for distance calculation.

17. The image processing method according to claim 14, further comprising:

inputting, to said gradation part, a value obtained by dividing the coordinate values of each of the vertexes of said polygon by a predetermined value to have the value fall in a range of color data processable by said gradation part, wherein said distance calculation regards the value obtained by dividing the coordinate values of said specific point by said predetermined value as the coordinate values of said specific point for distance calculation.

18. The program according to claim 15, further comprising the step of inputting, to said gradation part, a value obtained by dividing the coordinate values of each of the vertexes of said polygon by a predetermined value to have the value fall in a range of color data processable by said gradation part, wherein said distance calculating step regards the value obtained by dividing the coordinate values of said specific point by said predetermined value as the coordinate values of said specific point for distance calculation.

* * * * *